US006835159B2

(12) United States Patent
Gehring et al.

(10) Patent No.: US 6,835,159 B2
(45) Date of Patent: Dec. 28, 2004

(54) TORQUE TRANSMITTING DEVICE WITH BACKLAS-COMPENSATION

(75) Inventors: Dietmar Gehring, Aichstetten (DE); Stefan Bender, Engen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/136,809

(22) Filed: May 1, 2002

(65) Prior Publication Data

US 2002/0169050 A1 Nov. 14, 2002

(30) Foreign Application Priority Data

May 10, 2001 (DE) .......................................... 101 22 585

(51) Int. Cl.[7] .............................................. F16D 3/44
(52) U.S. Cl. ........................ 475/331; 464/157; 403/364
(58) Field of Search .......................... 475/331; 464/182, 464/157; 403/364

(56) References Cited

U.S. PATENT DOCUMENTS

| 1,277,491 A | * | 9/1918 | Scott ........................... 464/157 |
| 1,408,041 A | * | 2/1922 | Steenstrup ................... 464/157 |
| 3,599,512 A | * | 8/1971 | Wayman ...................... 475/331 |
| 4,222,290 A | * | 9/1980 | Helmer et al. ............... 475/331 |
| 4,901,602 A | * | 2/1990 | Matoba ........................ 475/331 |
| 4,944,376 A | * | 7/1990 | Ozaki et al. ............. 192/17 A |
| 5,226,517 A | * | 7/1993 | Grochowski ........... 192/85 AA |
| 5,636,935 A | * | 6/1997 | Beerens ....................... 403/241 |
| 6,364,781 B2 | * | 4/2002 | Kundermann ............... 464/185 |
| 6,561,944 B2 | * | 5/2003 | Lu et al. ...................... 475/331 |

FOREIGN PATENT DOCUMENTS

| DE | 195 44 316 A1 | 5/1996 | .......... F16D/11/04 |
| DE | 199 61 988 A1 | 7/2001 | .......... F16D/11/00 |

* cited by examiner

Primary Examiner—Ha Ho
(74) Attorney, Agent, or Firm—Davis & Bujold, P.L.L.C.

(57) ABSTRACT

A device for transmitting torque and axially securing a first and a second component (30, 40) that exert torque. The second component advantageously consists of a disk 40, which can be placed with its recesses 42, which are arranged on its periphery, onto the axial projections 33 of a first component 30 in such a way that the projections 33 of a first component 30 protrude axially from the recesses 42 of the disk 40, and that on the protruding projections 33 of the first component 30 a preferably annular component 20 can be placed in such a way that the first component 30 can be permanently connected with the annular component 20 on their contact surfaces.

9 Claims, 6 Drawing Sheets

I-I

TORQUE TRANSMITTING DEVICE WITH BACKLAS-COMPENSATION

FIELD OF THE INVENTION

A device for transmitting torque and the simultaneous axial securing two components that exert torque.

BACKGROUND OF THE INVENTION

The following explains the arrangements for transmitting torque between two rotating components known the older German publication No. P 199 61 988.3.

FIG. 1 shows a familiar device, where transmitting the torque is accomplished between an internal gear and a catch element in the form of a cylinder of a multiple-disk clutch (not shown in detail), whereby a piston is mounted in the cylinder in the conventional axially displaceable manner, which is sealed by an annular gasket from the cylinder. For the purpose of transmitting torque, the internal gear and the cylinder back of the cylinder are welded together at their adjoining surfaces. One disadvantage of such a solution is that a forced guidance exists between the internal gear and the cylinder, and no tangential, radial and axial compensation for play is possible.

FIG. 2 shows another familiar arrangement for transmitting torque between an internal gear and a catch element. In this example, contrate gear teeth, in which the teeth of the catch part can be axially inserted, are arranged on the side facing the catch element. In the axial direction, the catch part is secured by a snap ring in the way depicted. Such a solution requires greater axial space since the groove for the snap ring necessitates accordingly long teeth in the contrate gear. Furthermore, one additional component in the form of a snap ring is required, which makes the production of the device more expensive. This solution, however, permits tangential, radial and axial compensation for play to a certain extent in the desired manner.

FIGS. 3 and 4 show an arrangement, which we know from the older German publication P 199 61 988.3. In this example, the connection is realized with the help of an annular segment ring. Along its periphery, this ring contains tooth-shaped projections in the axial direction that are arranged at a distance from each other. These projections are inserted into the gaps of a second component in such a way that they come into contact with a plane surface of the neighboring first component. On this contact surface, the ring can be fastened to the first component, for example through welding. This enables a certain tangential, radial and axial compensation for play in the desired manner. This design, however, places very high demands on the weld seam, which has to transmit the entire torque. The ring is therefore exposed to great strain and must be sufficiently thick in order to enable appropriate welding and withstand the occurring strain. This in turn means that increased axial space is required.

SUMMARY OF THE INVENTION

The task on which the invention is based consists of creating a device for simultaneously transmitting torque and axially securing two components that exert torque, allowing a relatively simple connection of the two components and thus permitting tangential, radial and axial compensation for play. Additionally, the axial space should be reduced.

According to the invention, the task is resolved with an annular element yet to be described more closely in that this element is placed onto existing contrate gear teeth of a first component in such a way that the teeth of the contrate gear configuration protruding through the gaps of a second component come into contact with the annular element. On this contact surface, the annular element can be connected with a first component, preferably through a welding process. This guarantees that the desired torque is transmitted on one hand and that a defined play is enabled in the radial, axial and tangential directions on the other hand. Additionally there is no risk that a snap ring, which is necessary for the connection, could loosen. Since no groove for a snap ring must be incorporated, the height of the teeth and thus the required axial space can be reduced since only the thickness of the second component as well as the defined axial play must be taken into consideration.

The permanent connection of the invented annular ring with the contrate gear teeth of the first component also leads to its reinforcement. Thus, the gear teeth configuration can have a weaker design, saving additional space as well besides material.

The invented annular component can be produced beneficially through a simple stamping operation. For this, in a first embodiment, the component also does not have to be aligned during assembly. Compared to the segment ring from the older German publication P 199 61 988.3, it does not matter with the invented solution which side of the annular ring rests on the first component. Beneficial embodiments of the invention result from the dependent claims.

BRIEF DESCRIPTION OF THE DRAWINGS

The invention will now be described, by way of example, with reference to the accompanying drawings in which.

DETAILED DESCRIPTION OF THE INVENTION

Figure 1:
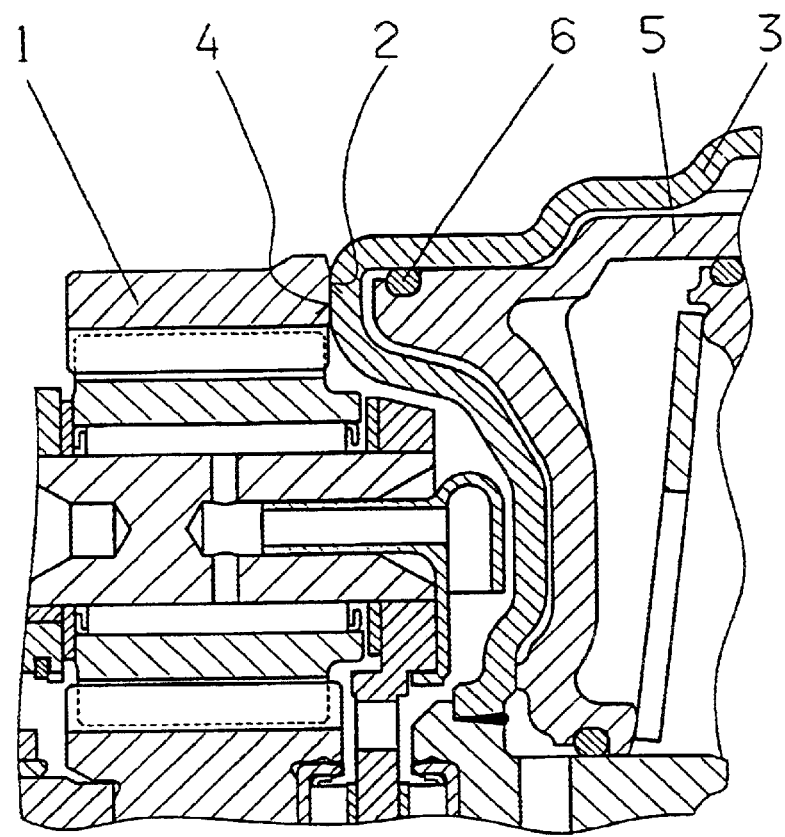
FIG. 1 Illustrates a familiar way for transmitting torque between two components, wherein the components are welded to each other.
Figure 2:
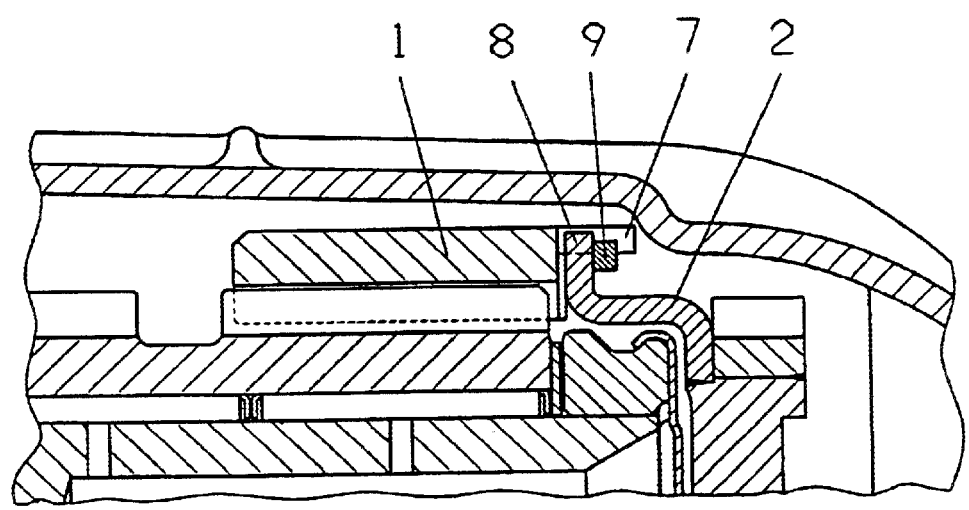
FIG. 2 shows another familiar way for transmitting torque between two components, wherein the one component engages in the contrate gear teeth configuration of the other component and an additional snap ring is provided for axial securing purposes.
Figure 3:
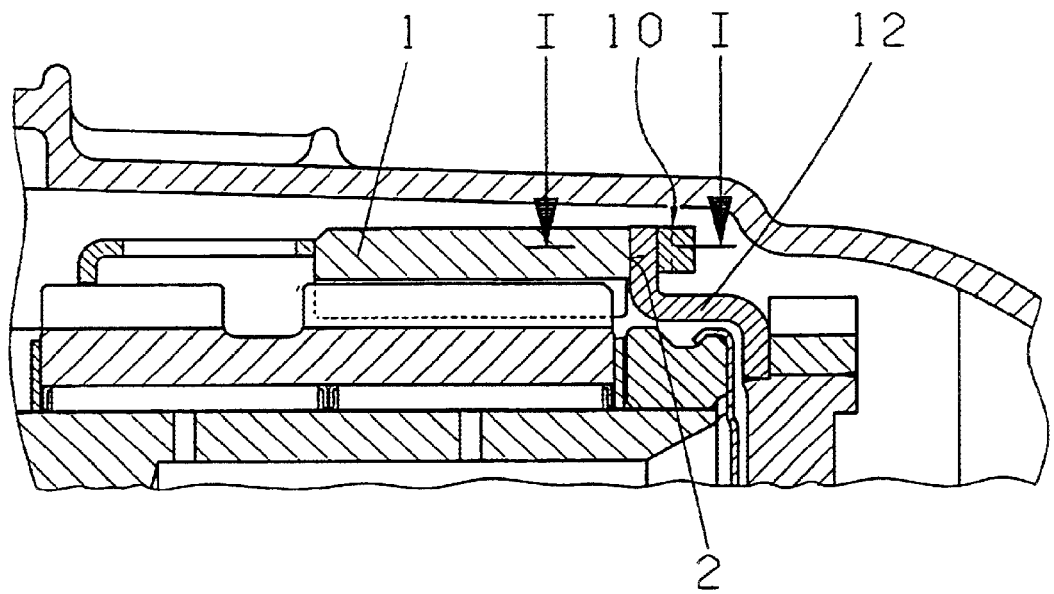
FIG. 3 depicts another familiar way for transmitting torque between two components, wherein the connection is realized with a segment ring, FIG. 4 provides a view in accordance with line I—I from FIG. 3.
Figure 4:
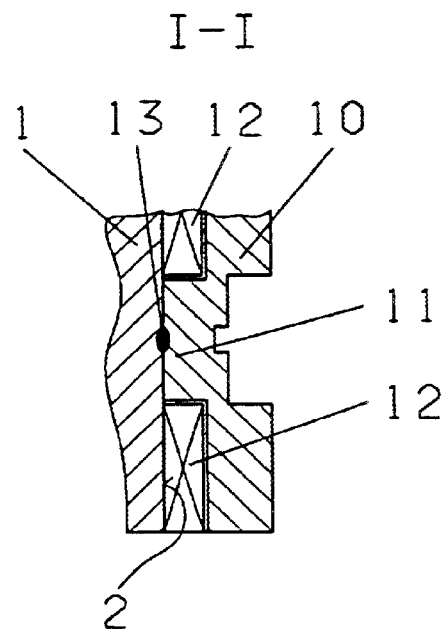
Figure 5:
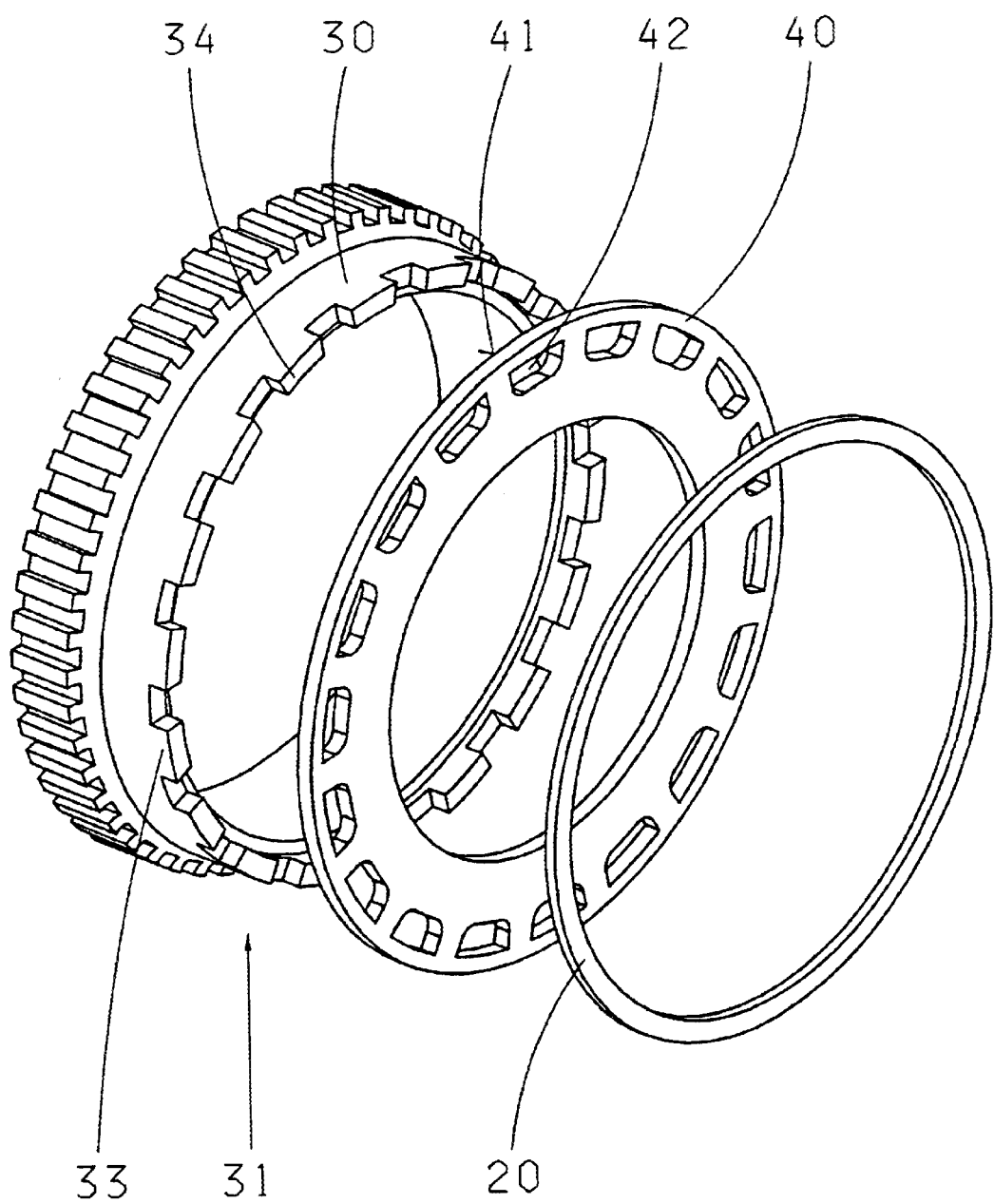
FIG. 5 represents a perspective view of an advantageous embodiment of the solution of the invention, FIG. 6 gives a sectional view of the solution of the invention, FIG. 7 provides a view in accordance with line II—II from FIG. 6.

As represented in FIG. 5, the invented component 20 advantageously consists of a flat annular ring.

The first component 30 advantageously has the shape of an internal gear 30, with a contrate gear teeth configuration 31 arranged on one side in the axial direction. Pursuant to FIG. 5, the contrate gear teeth 31 face a second component 40 and the ring 20.

The second component 40 advantageously has the shape of a disk 40. Pursuant to FIG. 5, the disk 40 contains recesses 42 in the circumferential direction that are arranged at equal distances. These recesses 42 are preferably produced with a simple stamping operation. These recesses 42 can hold the teeth 33 of the contrate gear configuration 31 of the internal gear 30.

Figure 6:
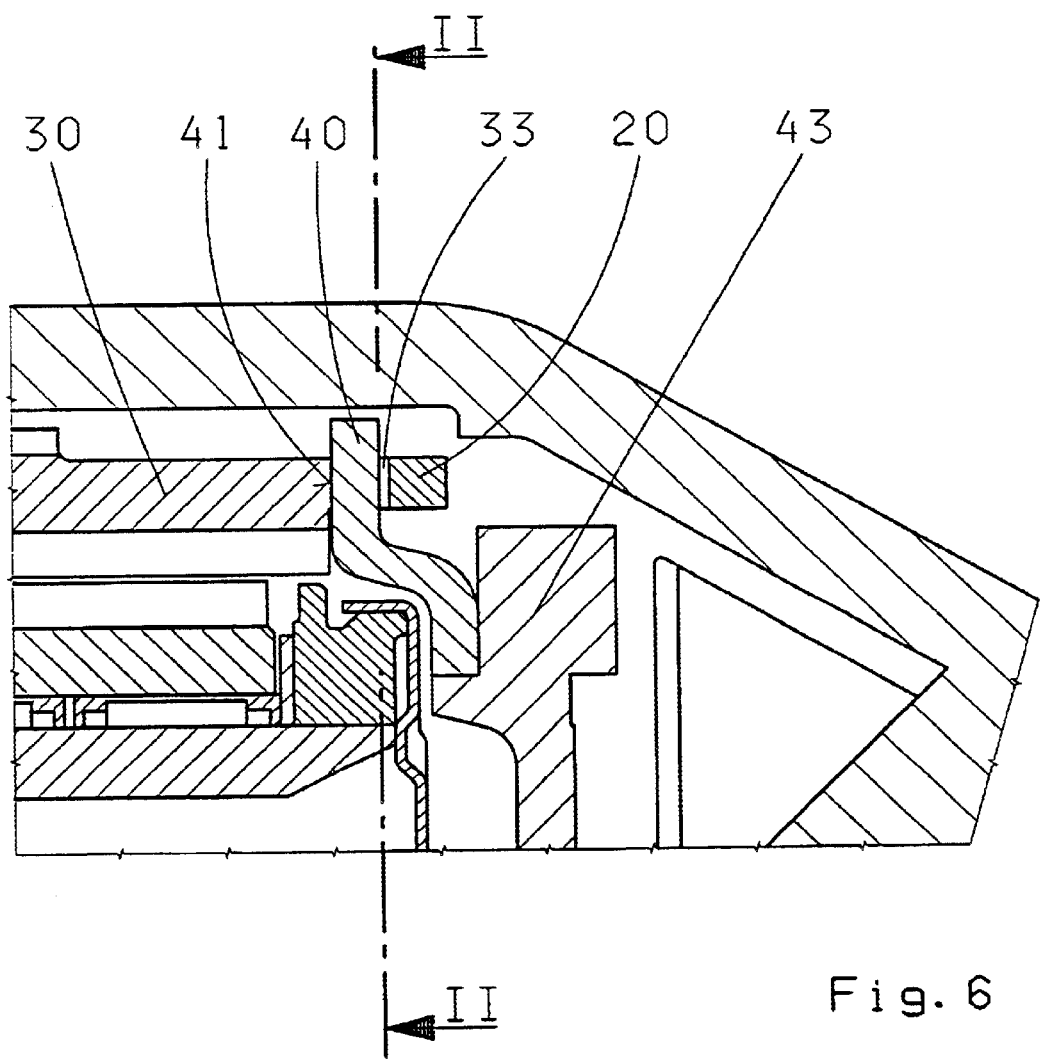

For the connection of the invention of two rotating components, the teeth 33 of the internal gear 30 are introduced into the gaps 42 of the disk 40. On the disk 40, as shown in FIG. 6, an output shaft 43 is arranged. The side of the disk 40 facing the contrate gear teeth configuration 31 is shown in FIG. 5 as side 41. The ring 20 is placed in the axial direction on the end faces 34 of the teeth 33 of the internal gear 30, which protrude from the gaps 42 of the disk 40. On this contact surface, the ring 20 is permanently connected with the internal gear 30. This is advantageously implemented with a welded connection, which is represented pursuant to FIG. 8 by a weld seam 24.

The internal gear 30 exerting torque thus transmits the applied torque to the disk 40 as the contrate gear teeth 31 engage in the recesses 42 of the disk 40. As shown in FIG. 6, a driven shaft 43 is arranged on this disk 40.

Figure 7:
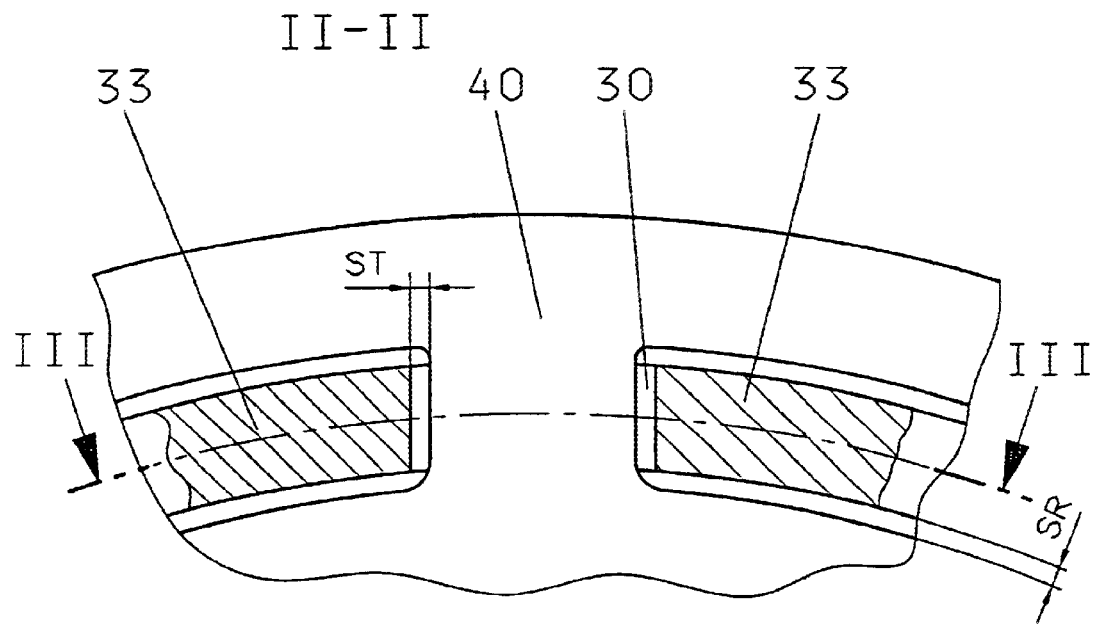

Pursuant to FIG. 7, the disk 40 is placed on the teeth 33 of the internal gear 30. This allows the possibility of taking tangential play ST and radial play SR into consideration.

Figure 8:
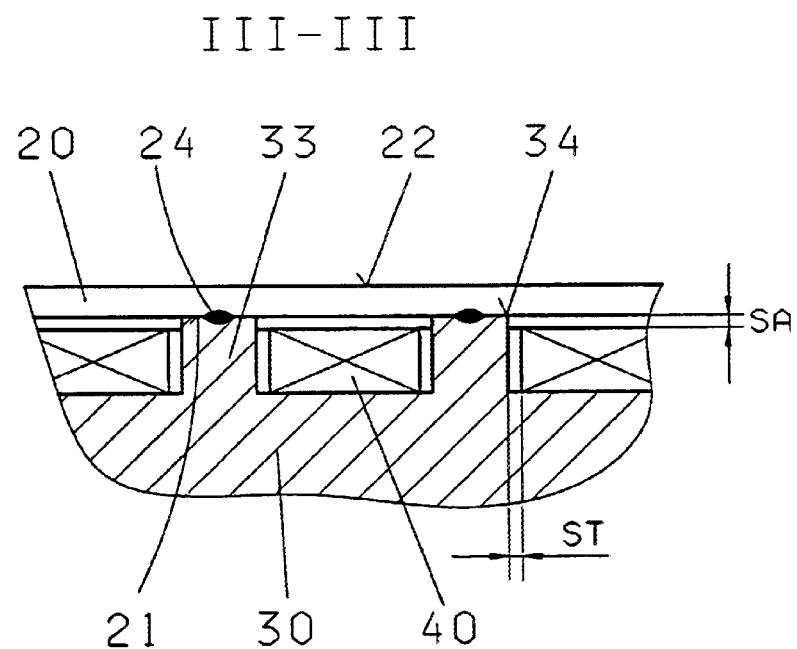
FIG. 8 represents a view in accordance with line III—III from FIG. 7, and FIG. 9 Illustrates another embodiment of the solution of the invention.

Pursuant to FIG. 8, for the purpose of axially securing the components 30 and 40, the component 20 is placed in the axial direction onto the adjoining components 30 and 40 in such a way that the ring 20 rests against the end faces 34 of the teeth 33. Thus offers the possibility of taking axial play SA into consideration.

Actual fastening of the component 20 to the component 40 then occurs through a permanent fastening operation, preferably a welding process. In particular, the inexpensive condensation discharge welding process (CD welding) can be used, whereby, however, other welding processes are also possible. In certain applications, it is also feasible to conduct fastening with a gluing process.

Figure 9:
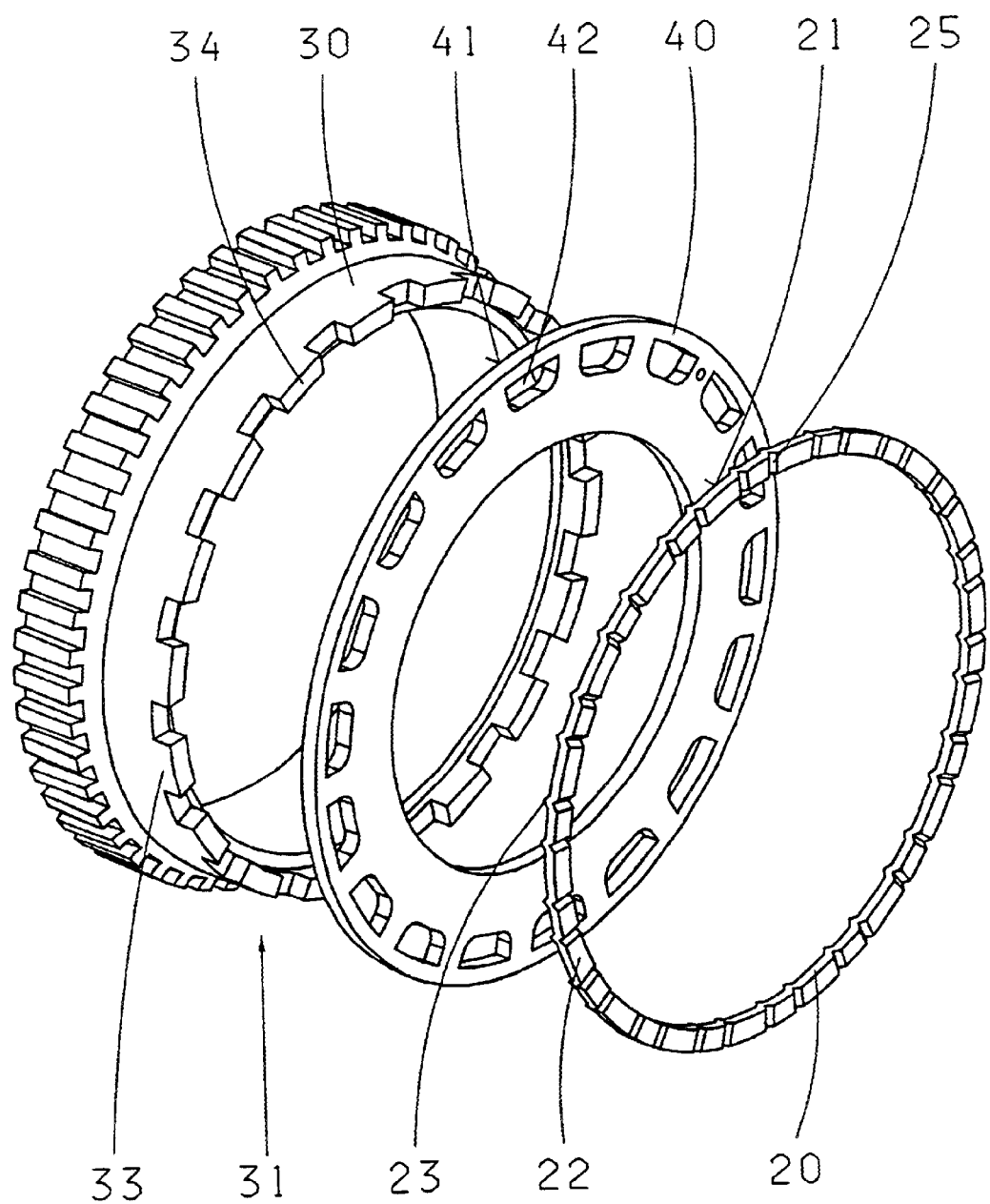

FIG. 9 depicts another advantageous embodiment of the invented solution. Along its periphery, an annular component 20 contains rib-shaped elevations 23, which are arranged at equal distances from each other. These ribs 23 can be incorporated with a stamping operation from the annular component 20 in the axial direction towards one side. This side is depicted as side 21 in FIG. 9 and is aligned towards the first component 30. By stamping the ribs 23 in the ring 20, indentations 25 are formed on the ring 20 on the second side 22. During a welding operation, in particular during the condensation discharge welding process, the ribs 23 can be used as welding material supply, with a weld seam 24 being formed pursuant to FIG. 8.

REFERENCE NUMBERS 1 internal gear
2 surface
3 catch element
4 surface
5 piston
6 gasket
7 contrate gear teeth configuration
8 teeth
9 snap ring
10 segment ring
11 projections
12 component
13 weld seam
20 ring
21 surface
22 surface
23 ridges
24 weld seam
25 recesses
30 internal gear
31 contrate gear teeth configuration
33 teeth
34 surface
35 disk
41 surface
42 recesses
43 driven shaft
SR radial play
ST tangential play
SA axial play

What is claimed is:

1. A device for transmitting torque comprising:
an axially secured first component (30) and an axially secured second component (40) for transmitting torque, wherein the second component (40) has recesses (42), arranged adjacent an outer periphery of the second component (40), which engage with extending projections (33) of the first component (30) which protrude axially from the recesses (42) whereby on the projections (33) protruding from in the recesses (42) an annular component (20) can be placed to permanently connect the first component (30) with the annular component (20), wherein the first component (30) comprises a gear wheel (30) and the second component (40) is fastened to a driven shaft (43).

2. The device according to claim 1, wherein the recesses (42) of the second component (40) are equally spaced about the outer periphery thereof, and the projections (33) of the first component (30) are equally spaced about an outer periphery thereof.

3. The device according to claim 1, wherein the annular component (20) contains axially extended radial ridges (23) which contact end faces of the projections (34) and are weldable to the projections.

4. A device for transmitting torque comprising
an axially secured first component (30) having a plurality of projections (33);
an axially secured second component (40) having a plurality of recesses (42) arranged adjacent an outer periphery of the second component; and
a connection between the first and second components;
wherein the projections (33) of the first component (30) extend through and protrude axially from the plurality of recesses (42), and an annular component (20) is fastened to a face of each said plurality of projections (33) protruding from the respective plurality of recesses (42) to permanently connect the first component (30) with the annular component (20); and
the connection permits axial and tangential play between the first and second components; and the first component (30) comprises a gear wheel (30) and the second component (40) is fastened to a driven shaft (43).

5. The device for transmitting torque as set forth in claim 4 wherein each said recess (42) is radially larger than each respective projection (33), and each said plurality of projections is axially longer than each respective recess (42).

6. A device for transmitting torque comprising:
a first component (30) having a plurality of projections (33);

a second component (40) having an outer periphery and an inner periphery, wherein the second component (40) has a plurality of recesses (42) arranged closer to the outer periphery than to the inner periphery;

the projections (33) of the first component (30) extends through the plurality of recesses (42) of the second component (40) to form a connection between the first and second components; and an annular ring (20), having a diameter substantially equal to a diameter of the projections (33), is fastened to an end face of the plurality of projections (33), protruding from the plurality of recesses (42), to permanently connect the first component (30) to the annular component (20); and the connection between the first and second components facilitates at least one of axial and tangential play between the first and second components and abutment of the annular component (20) against the outer periphery of the second component (40) retains the first component (30) engaged with the second component (40); and the first component (30) comprises a gear wheel (30) and the second component (40) is fastened to a driven shaft (43).

7. The device for transmitting torque as set forth in claim 6, wherein each recess (42) is larger in dimension than the projection (33) received therein, and each projection has a length which is greater than a depth of the recess (42) receiving the projection (33).

8. The device according to claim 6, wherein the recesses (42) of the second component (40) are equally spaced about the outer periphery thereof, and the projections (33) of the first component (30) are equally spaced about an outer periphery thereof.

9. The device according to claim 6, wherein the annular component (20) contains axially extended radial ridges (23) which contact end faces of the projections (34) and-are weldable to the projections.

* * * * *